Figure 1:
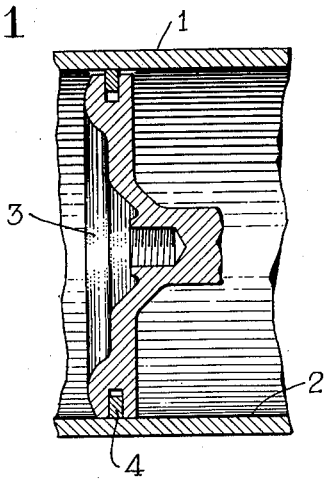

Feb. 29, 1944.  R. T. WHITNEY ET AL  2,342,775

PISTON CONSTRUCTION

Filed May 27, 1942

INVENTORS
Ralph T. Whitney
Frank E. Miller
BY 
ATTORNEY

Patented Feb. 29, 1944

2,342,775

UNITED STATES PATENT OFFICE 2,342,775

PISTON CONSTRUCTION

Ralph T. Whitney, Irwin, and Frank E. Miller, Swissvale, Pa., assignors to The Westinghouse Air Brake Company, Wilmerding, Pa., a corporation of Pennsylvania Application May 27, 1942, Serial No. 444,657

10 Claims. (Cl. 309—4)

This invention relates to piston constructions and more particularly to the type employed in air brake devices used on railway vehicles.

In air brake devices pistons are employed for various uses such as for operation upon a change in air pressure on one side or the other to effect an application of brakes on a vehicle, a release of said brakes, or to accomplish other desired brake controlling operations. The pistons are arranged to reciprocate in bores, and in accordance with usual practice the diameter of the piston heads is somewhat less than that of the bores. The piston heads are therefore provided with peripheral ring grooves carrying packing rings which are expanded into contact with the walls of the bores to provide leaktight seals between the pistons and walls.

Due to the fact that the diameter of a piston head such as above described is less than that of the bore in which it operates, the head is capable of a certain degree of radial movement relative to the ring and the wall of the cylinder bore. This relative movement is slight and resisted by friction between the ring and the side walls of the ring groove in the head. Nevertheless, in a brake device applied to a railway vehicle which at times is subject to severe shock, due for instance to the vehicle wheels striking uneven joints between the rails in a track, the resulting vibration is liable to cause such relative movement between the piston head and ring as to undesirably cause hammer-like blows between the head and the wall of the bore in which it operates.

In time these blows may result in two grooves being formed in the cylinder wall, one groove at either side of the ring where the head contacts the wall. If the piston head is arranged with its axis horizontal, such grooves may be formed in only a portion of the cylinder wall, as below the piston, but if its axis is vertical, the grooves may extend completely around the wall. In devices such as triple valves this grooving of the cylinder wall is most likely to occur in the brake release position of the piston since the piston occupies this position the major portion of the time that a vehicle is in use.

The grooving of the cylinder wall as above described is very objectionable, particularly in air brake devices, because it tends to create or increase leakage of fluid under pressure from one side of the piston to the other and thereby reduce the sensitivity of the device to a normal variation of fluid pressure on one face, and in case the leakage becomes sufficient it might even cause a device to fail to operate. Moreover, the piston head or ring is liable to catch on a side of one groove or the other in the cylinder wall and thus require a greater than normal pressure differential to start the piston moving out of its release position upon a reduction in pressure on one side of the piston. Under such circumstances if and when the piston does start moving it might jump or overtravel a desired position and cause an undesired operation.

One object of the invention is therefore the provision of an improved piston structure arranged to avoid the above mentioned difficulty.

Another object of the invention is the provision of a piston head having a greater or less portion of the periphery so constructed and arranged as to prevent grooving of the wall of the bore in which it operates in case of hammering of the piston head against said wall.

Another object of the invention is the provision of a piston structure the whole or less than the whole of the periphery of the head of which is covered with material which is softer than the material in the wall of a cylinder bore in which the piston operates so as not to groove said wall in case of radial movement of the piston head relative to said wall of such intensity as to develop a hammer-like force in the moving part.

Still another object of the invention is the provision of a piston structure having means on a greater or less portion of the periphery of its head arranged to engage the wall of the bore in which the piston operates for damping the force of contact between the piston head and said wall upon relative movement between these parts so as to prevent grooving of said wall.

Other objects and advantages will be apparent from the following more detailed description of the invention.

Figure 6:
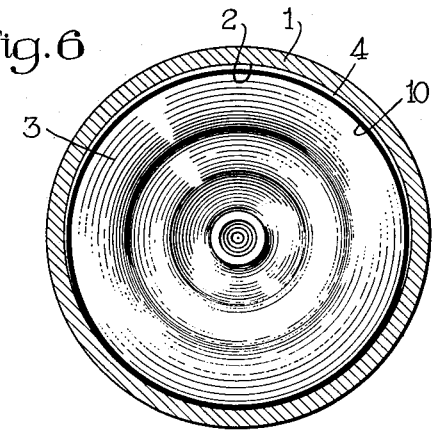
Figure 4:
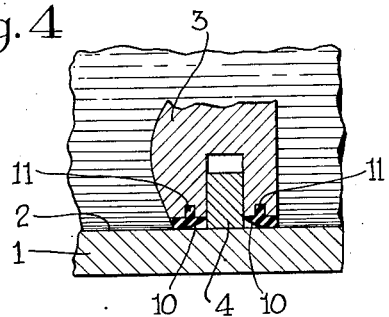
Figure 7:
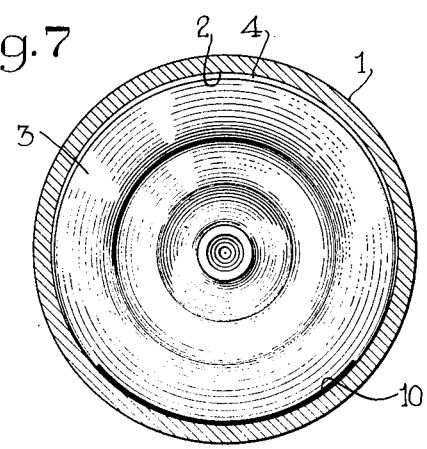

In the drawing, Fig. 1 is a cross-sectional view of a portion of a piston cylinder and of a piston of standard structure mounted therein, illustrating a portion of the piston head and cylinder wall in contact with each other; Figs. 2 to 5 are cross-sectional views of a portion of a cylinder and a portion of a piston therein constructed in accordance with four different concepts of the invention; these views being on an enlarged scale with respect to Fig. 1 in order to clearly show the invention; and Figs. 6 and 7 are cross-sectional views of a cylinder and piston arrangement similar to the corresponding parts shown in cross-section in Fig. 1 but illustrating two different adaptations of any one of the piston structures shown in Figs. 2 to 5.

Description

In the drawing the reference numeral 1 indicates a cylinder which may be made of any suitable metal, such as bronze, and which has a bore 2 in which a piston head 3 is mounted to reciprocate. The piston head 3, which may also be made of any suitable metal such as bronze, is in accordance with conventional practice preferably slightly smaller in diameter than bore 2, as shown to an exaggerated degree in Figs. 1, 6 and 7. The piston head is therefore provided with an annular ring groove open at the periphery of the head. In this groove is mounted an expansible ring 4 which is expanded into sliding contact with the wall of bore 2 to prevent the flow of fluid under pressure from one side of the ring and piston head to the opposite side.

Since the diameter of the piston head is less than that of bore 2 the piston head is capable of slight movement relative to the wall of said bore in a radial direction. For instance, if the piston head is arranged to move horizontally as shown in the illustration in Fig. 1, the head may move downwardly relative to the piston ring 4 to a position in which the head at opposite sides of the ring is in contact with the bottom portion of the wall of bore 2. Due to this possible relative movement if the cylinder 1 is subject to severe vibration, as may be the case in air brake devices applied to railway vehicles, it will be seen that such relative movement between the cylinder and piston head may be attained as to cause striking between these parts with such intensity as to cause grooves being formed in the wall of bore 2 at both sides of the ring 4 where the piston head 3 engages said wall. This grooving of the wall of bore 2 is objectionable as before described and may be avoided by any one of the structures illustrated in Figs. 2 to 5 as applied to the piston head 3 in any one of a number of different manners, two of which are illustrated in Figs. 6 and 7.

Generally, the invention consists of the provision on the periphery of piston head 3 of a striking member for contacting the wall of bore 2 which will not result in grooving of said wall upon impact between the piston head and wall. This member may be made of any suitable material which is softer than the material from which the cylinder 2 is made, such for instance as a resilient material having the property of absorbing or cushioning impact forces, which material may be of a rubber composition or leather or cork. The material may if desired be of a harder nature, such as lead or alloys thereof, or copper or Bakelite which are not resilient like rubber etc., but which are incapable, for the use intended, of producing grooves in the wall of bore 2. This material applied to the periphery of the piston head may be of any desired thickness, paper thin may be satisfactory with certain of the materials or for use in certain devices, and may be of any desired width for strking contact with the wall of bore 2. Moreover, the piston head 3 may be reduced in diameter or its periphery recessed to such a degree that with the material just described applied to the periphery of the piston head, the diameter of the head will be the same as heretofore used as illustrated in Figs. 1, 6 and 7.

The shock absorbing or groove preventing material applied to the piston head 3 in accordance with the invention is indicated in Figs. 2 to 7 of the drawing by the reference numerals 10 and may be secured in place by moulding or bonding of the material to the piston, by the use of suitable adhesives or in any other desired manner. Moreover, if desired, the part or parts 10 may be keyed in place in any suitable manner as by a tongue 11 extending into a suitable groove or recess providing in the piston head as shown in Figs. 2 to 5.

Figure 2:
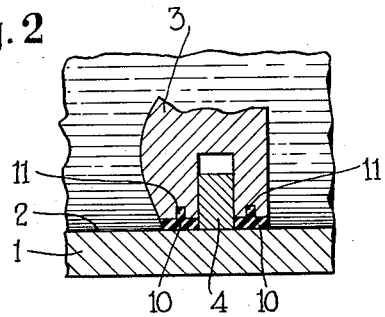
Figure 3:
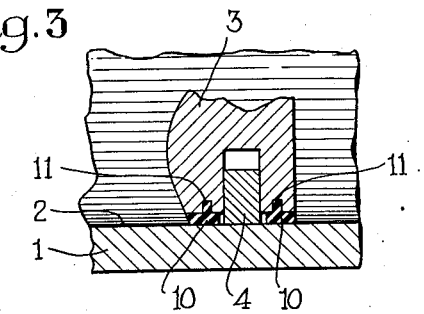
Figure 5:
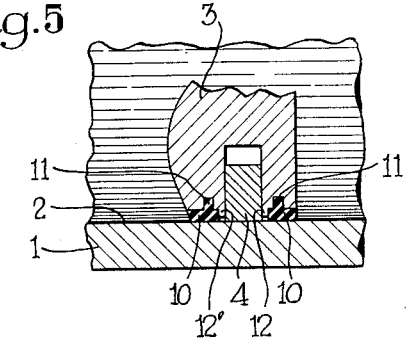
Figure 5:
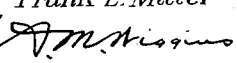

These shock absorbing or groove preventing materials or members 10 in Fig. 2 extend over the full width of the periphery of piston head 3 at opposite sides of the piston ring 4 in order to obtain a maximum amount of material for contact with the wall of bore 2. In this structure it will be seen that the adjacent edges of the shock absorbing members 10 are aligned with the side walls of the piston ring groove and may therefore engage the opposite sides of the ring 4, but this may be avoided if desired by either of the structures shown in Figs. 3 and 4. In Fig. 3 it will be seen that the width of the members 10 is reduced so as to provide space between the opposite sides of the ring 4 and the adjacent edges of said members, while in Fig. 4 the adjacent edges of members 10 are merely cut off at an angle to avoid contact with the ring 4. If desired, the periphery of the piston head may be recessed only a portion of the distance from its opposite faces in the direction of the groove in which ring 4 operates in order to retain at either side of the ring groove a shoulder 12, as shown in Fig. 5, against one side of which the adjacent edges of members 10 may abut so as to thereby hold the adjacent edges of said members against flow into contact with the sides of the ring. The opposite sides of shoulder 12 constitute portions of the ring groove, as will be apparent from the drawing. In this structure the diameter over the members 10 is the desired diameter of the piston head and the shoulders 12 are of less diameter to insure against said shoulders contacting the wall of bore 2.

The members 10 constructed as shown in any one of Figs. 2 to 5 may be applied to the piston head 3 in any one of a number of different ways. For instance, the members 10 may be in the form of annulus extending around the whole periphery of the piston head as shown in Fig. 6. Such a structure would be particularly useful in air brake devices applied to railway vehicles in such a manner that the piston head in the device would operate in a vertical direction in which case vibration of the vehicle would be likely to cause relative movement between the cylinder 1 and piston head 3 radially in all directions, at some time or another, which with conventional type of piston structures might result in any annular groove being formed all the way around the wall of bore 2.

In Fig. 7 the members 10 are in the form of segments of a circle applied only to that portion of the periphery of piston head 3 which may contact the wall of bore 2. In a device where the piston head 3 is arranged to reciprocate horizontally, as indicated in Fig. 1, the elements 10 in the form of segments as shown in Fig. 7 would be provided at the bottom of the piston head and need be only of such length as to insure against contact between the wall of bore 2 and the metal of piston head 3 at either end of the segments.

Summary

It will now be seen that we have provided a piston head having a member or members, of suitable material, arranged around a greater or less portion of the periphery of the head for contacting the wall of the cylinder bore upon relative radial movement between the piston head and said wall so as to prevent the piston head from causing the development of grooves in said wall. The shock absorbing or groove preventing members 10 may be applied to the piston head around its full periphery or to only a critical portion of the periphery, as desired or required to accomplish the desired end. Further, these members may be made of any suitable material which is softer than that from which the piston cylinder is made or which will not groove same upon impact therewith. These members may also be of different cross-sectional form according to material used in the members or to the use of the piston.

Having now described our invention, what we claim as new and desire to secure by Letters Patent, is:

1. A piston head having an annular ring groove open at the peripheral surface of the head and having a member in said surface for engagement with the wall of a cylinder bore, said member being made of softer material than the material of said wall and extending from one side of said piston in the direction of but terminating short of the adjacent side wall of said groove, and said piston head having a shoulder one side of which constitutes a portion of one wall of said groove while the opposite side is arranged for engagement by the adjacent edge of said member.

2. A piston comprising a head having an annular ring groove open to the peripheral surface of said head, a piston ring in said groove, said head being slidable radially relative to said ring, and means secured to said head and constituting a portion at least of said surface and extending radially beyond said head throughout the length of said portion of surface for contact with a cylinder wall to support said head out of contact with said wall, said means being made of material which will not damage said wall upon impact therewith.

3. A piston comprising a head having an annular ring groove, a piston ring in said groove, said head being slidable radially relative to said ring, and a ring shaped member encircling and secured to said head at one side of said groove and extending beyond the periphery of said head for contact with a cylinder wall to support said head out of contact with said wall, said member being made of material which will not damage said wall upon impact therewith.

4. A piston head having an annular ring groove and a member at each side of said groove secured to said head and constituting a portion at least of the peripheral surface of said head circumferentially thereof and extending substantially the full width of said surface at each side of said groove, the two members extending radially beyond said head throughout said portion of surface for contact with a cylinder wall, said members being made of material which will not damage said wall upon impact therewith.

5. A piston head having an annular ring groove and at each side of said groove a recess extending around a portion at least of the circumference of said head, and a member disposed in each of the two recesses and secured to said head, the two members projecting radially beyond said head throughout the length of said recesses for contact with a cylinder wall and being made of material which will not damage said wall upon impact against said wall.

6. A piston head having an annular ring groove and at each side of said groove a recess extending around a portion at least of the circumference of said head, and from said groove to the adjacent end of said head, and a member disposed in each recess and secured to said head, the two members extending radially beyond said head throughout the length of the recesses for contacting a cylinder wall and being made of material which will not damage said wall upon impact therewith.

7. A piston head having an annular ring groove and at each side of said groove a recess extending around a portion at least of the circumference of said head, said head having at each side of said groove throughout the length of the two recesses an outwardly extending rib constituting a portion of one wall of said ring groove and defining an inner wall of the respective recess, and a member disposed in each recess in contact with the respective rib and extending radially of said head beyond the respective rib throughout its length for contact with a cylinder wall, the two members being made of material which will not damage said wall upon impact therewith.

8. A piston head having an annular ring groove and at each side of said groove a recess extending around a portion at least of the circumference of said head, and from said ring groove to the adjacent end of said piston head, and a member disposed in each of the two recesses and extending radially beyond said piston head throughout the length of the respective recess for contact with a cylinder wall to hold said head out of contact with said wall throughout the length of said members, each of the two members extending from the adjacent end of the piston head to a point spaced from the adjacent side wall of said ring groove.

9. A piston head having an annular ring groove and at each side of said groove a recess extending around a portion at least of the circumference of said head, and from said ring groove to the adjacent end of said piston head, and a member disposed in each of the two recesses and extending radially beyond said piston head throughout the length of the respective recess for contact with a cylinder wall to hold said head out of contact with said wall throughout the length of said members, each of the two members having one side aligned with the adjacent end of the piston head and having a bearing surface for contact with said wall of a width less than the distance between said adjacent end of the piston head and the adjacent side wall of said groove.

10. In a piston for mounting in a cylinder bore, a radially movable piston head having a packing ring groove formed in the peripheral edge surface thereof, a packing ring mounted in said groove for sealing engagement with the wall of said cylinder bore, and a non-sealing striking element carried by said peripheral edge surface at at least one side of said groove for engagement with said wall to maintain the piston head out of contact with said wall.

RALPH T. WHITNEY.
FRANK E. MILLER.